Sept. 23, 1924.  M. R. COLE  1,509,587
WATER TURBINE
Filed Nov. 28, 1922   2 Sheets-Sheet 1
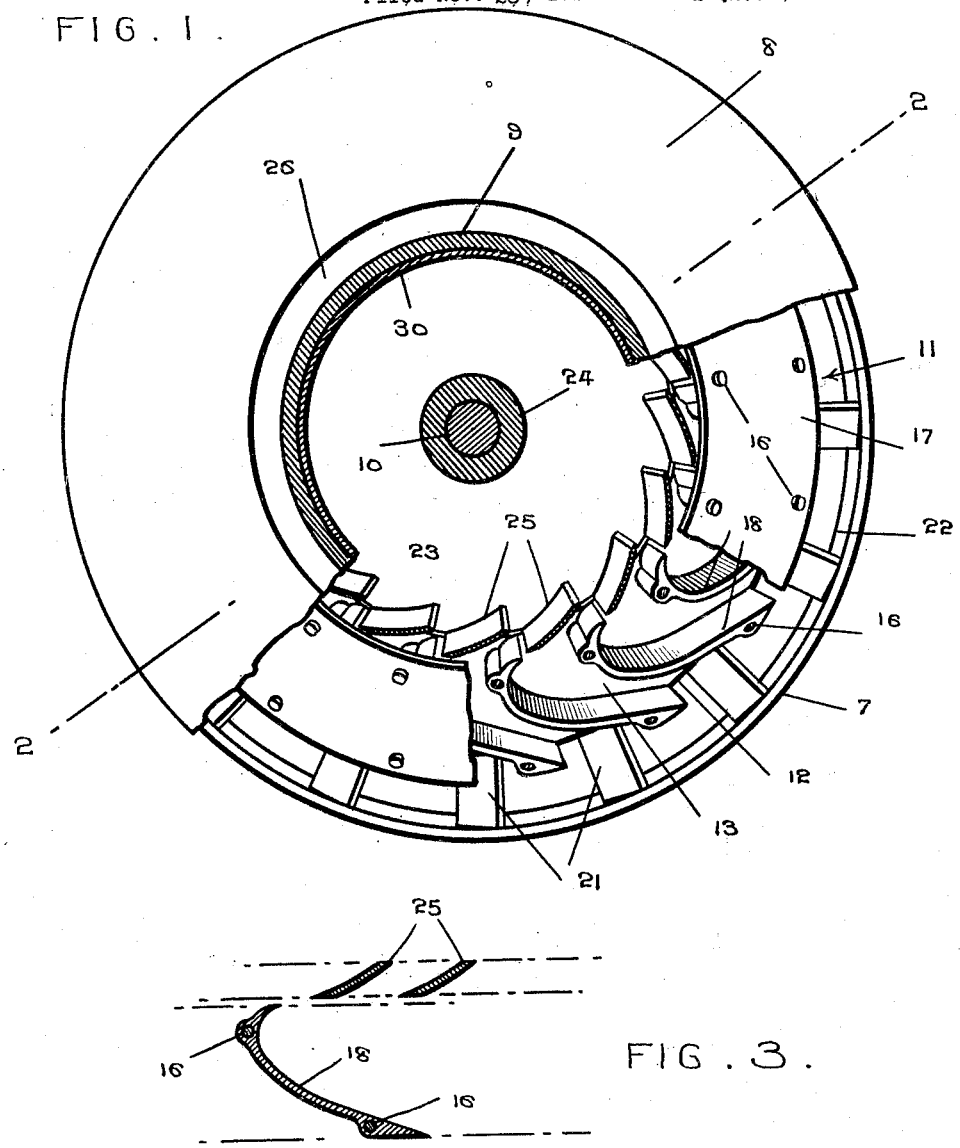
FIG. 1.
FIG. 3.
Inventor:
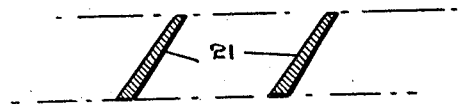
M. R. COLE,
By Monroe E. Miller
Attorney.

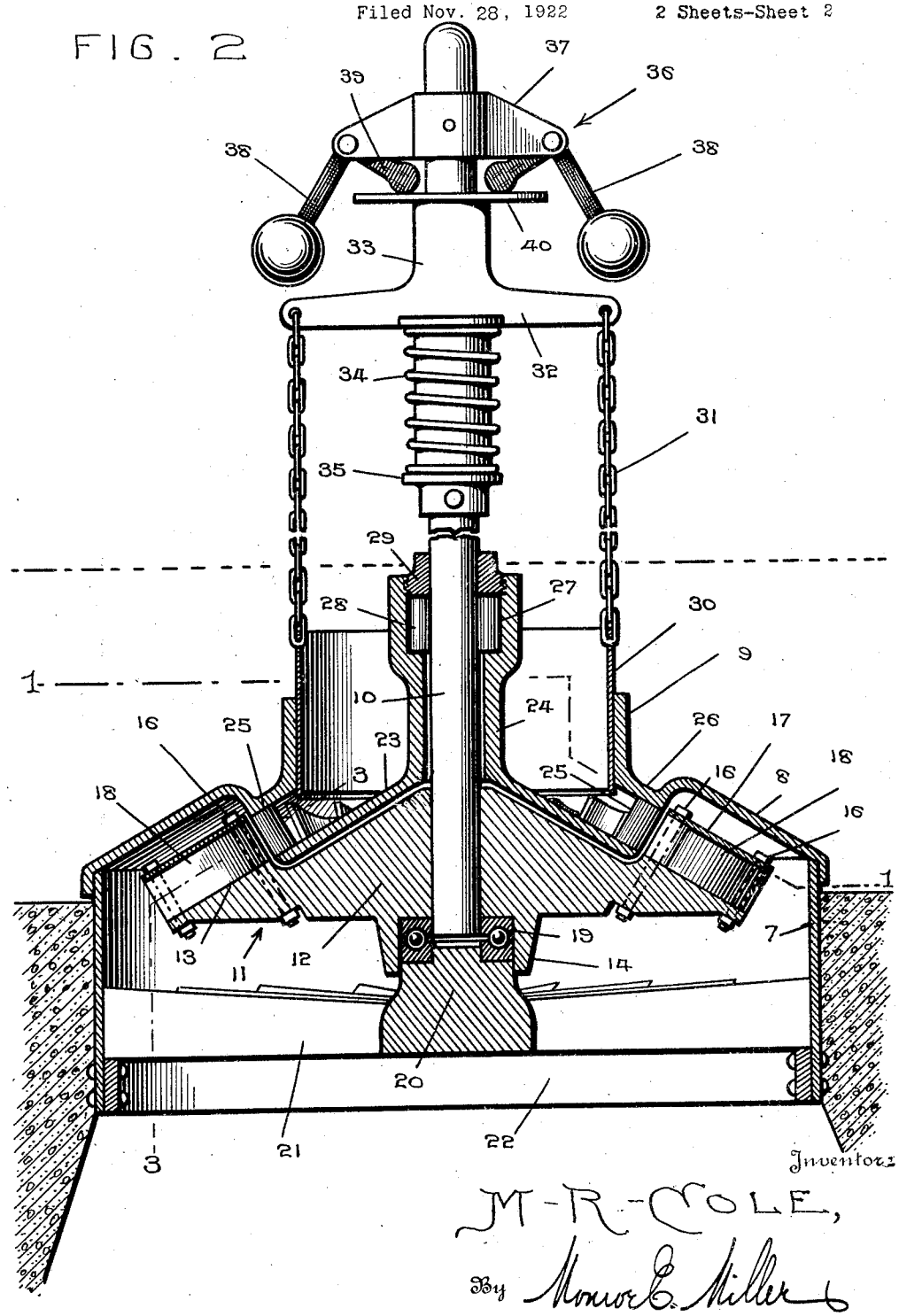

Patented Sept. 23, 1924.

1,509,587

UNITED STATES PATENT OFFICE.

MELVILLE R. COLE, OF MONTE VISTA, COLORADO, ASSIGNOR OF ONE-HALF TO WILLIAM M. VASTINE, OF MONTE VISTA, COLORADO.

WATER TURBINE.

Application filed November 28, 1922. Serial No. 603,796.

*To all whom it may concern:*

Be it known that I, MELVILLE R. COLE, a citizen of United States, residing at Monte Vista, in the county of Rio Grande and State of Colorado, have invented certain new and useful Improvements in Water Turbines, of which the following is a specification, reference being had therein to the accompanying drawing.

The present invention relates to water turbines and motors, and aims to provide a novel and improved power apparatus of that kind for utilizing the combined gravity pressure and centrifugal action of the water.

Another object is the provision of a novel turbine structure wherein the rotor or runner is driven by gravity pressure of the water assisted by centrifugal action, for obtaining maximum power and an efficient and smooth running action.

A further object is the provision of such a turbine having novel means for controlling the flow of water to regulate the speed and power.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawing, wherein—

Figure 1 is a section on the line 1—1 of Fig. 2 showing the turbine in fragmentary plan view.

Fig. 2 is a vertical diametrical section on the line 2—2 of Fig. 1.

Fig. 3 is a diagrammatical sectional view on the line 3—3 of Fig. 2, showing the relation of the several sets of blades.

The turbine casing has the cylindrical rim 7 and the frusto-conical top 8, and the water inlet neck 9 extending upwardly from the upper smaller portion of the top 8. The bottom of the casing is open, and said casing is substantially in the form of an inverted funnel, the lower outlet portion of the casing being of larger diameter and area than the upper inlet portion. As shown, the rim 7 is embedded in a concrete base of a reservoir.

A vertical shaft 10 is located axially within the casing and pipe 9, and the rotor or runner 11 of the turbine is secured to the lower terminal of said shaft for rotation within the casing. Said rotor includes a cone-shaped body 12 secured on the shaft, and having a depending annular skirt 14. The rotor includes a frusto-conical ring 17 spaced above and parallel with the marginal conical surface 13 of the rotor body 12, and a series of buckets or blades 18 are located between said surface 13 and the ring 17. Said buckets or blades are suitably curved, as seen in Fig. 3, and the ring 17 will constrain the water to flow between and along said buckets or blades when delivered against the upper ends of said buckets. Bolts 16 extend through the ring 17, buckets 18 and rotor body 12 to clamp the ring and buckets to said body.

In order to support the shaft 10 for rotation, an annular ball step bearing 19 is disposed around the lower end of the shaft 10 and seats on the central boss or hub 20 of the radial blades or bridge tree spokes 21 located below the rotor, whereby the shaft and rotor are supported by said blades or spokes. The skirt 14 surrounds the bearing 19 and fits around the hub 20 to protect the bearing. The outer ends of the spokes abut the rim 7 of the casing and seat on a supporting ring or ledge 22 secured in said rim 7 at the lower edge thereof. Said blades or spokes provide a spider or bridge which supports the bearing 20 at the center, thereby carrying the weight of the shaft and rotor, and said blades or spokes are inclined transversely opposite to the inclination of the buckets or blades 18 which move above said spokes. The spokes 21 not only serve to support the shaft and rotor but are also arranged for the impinging of the water against same when discharged from the buckets.

A conical shield 23 is disposed immediately above the conical body 12 of the rotor, and carries an upstanding sleeve 24 at its apex through which the shaft 10 extends. The lower edge of the shield 23 terminates adjacent to and slightly above the buckets 18 substantially flush with the surface 13 of the rotor body, and water guides or deflectors 25 are disposed between the lower edge portion of the shield and the upper or smaller portion of the top 8 of the casing, which is depressed around the neck 9, as at 26. The guides or blades 25 are located between the shield 23 and said depressed portion 26, and the parts are preferably integral or secured together in any suitable manner. The guides or blades 25 are so inclined as to deflect the water into the buckets so as to impinge against and within the buckets for imparting rotation to the rotor. The top 8 of the casing is offset upwardly above the ring 17 to be spaced from same, with the portion 26 substantially flush with the ring 17, whereby the portion 26 directs the water under the ring 17 to pass through the annular water space of the rotor between the ring 17 and surface 13 in which the buckets 18 are located.

The shaft 10 is journaled in the upstanding sleeve 24, to support the shaft in vertical position for free rotation. Thus, the sleeve 24 has a recess 27 in its upper terminal in which a bearing for the shaft is disposed. As shown, rollers 28 are disposed in said recess to provide an anti-frictional bearing, and an annular plug 29 is screw-threaded into said recess for concealing the rollers and fits snugly around the shaft.

In order to control the flow of water to the rotor, so as to regulate the speed and power, a cylindrical gate or sleeve valve 30 is slidable vertically in the neck 9 and when slid downwardly will restrict the flow of water into the annular space between the shield 23 and portion 26, and the lower down the valve is moved, the more will be the reduction in the flow of water under the lower edge of the valve to the guides or blades 25 and rotor. The water flows down through the valve or sleeve 30 and is deflected by the shield 23 under the lower edge of the valve to the guides or blades 25.

The valve 30 is automatically controlled, whereby the speed of the rotor can be maintained uniform. Thus, the valve 30 is suspended by chains 31 or other flexible or suitable suspending members, from the outstanding arms 32 of a sleeve 33 fitted loosely on the shaft 10, preferably above the water level. The sleeve 33 is yieldingly raised by a spring 34 surrounding the shaft and confined between the sleeve 33 and a collar 35 secured on the shaft below said sleeve. The valve 30 is therefore raised by the spring 34, to open the valve, and a governor 36 is mounted on the shaft and is operable for closing the valve more or less as the speed of the rotor and shaft varies. The governor 36, as shown, comprises the spider 37 secured to the shaft above the sleeve 33, and weighted arms 38 pivoted to said spider, and having the arms 39 bearing on an annular flange 40 of the sleeve 33, whereby when the arms 38 are swung outwardly away from the shaft and upwardly, the arms 39 being moved downwardly, will depress the sleeve 33 against the tension of the spring 34, thereby permitting the valve 30 to gravitate in the neck 9 for reducing the flow of water to the rotor. The governor will thus automatically reduce the flow of water to the rotor, when the speed is increased, thereby rendering the speed and power uniform. The sleeve 33 being disposed loosely on the shaft 10 will not rotate, and can be constrained against rotation if necessary.

With the present arrangement, the buckets or blades of the rotor are disposed in a conical arrangement and are inclined, for using both the gravity pressure and centrifugal action of the water for obtaining the power to rotate the rotor and shaft. The shield 23 at the lower end of the water inlet will spread the column of water to flow downwardly and away from the axis of the shaft 10 and rotor, and the guides or blades 25 will deflect the water so as to strike the buckets 18 and thus impart rotation to the rotor. The rotor buckets or blades 18 are so curved that the water in moving along said buckets away from the vertical axis of the rotor will result in the centrifugal action of the rotor, it being noted that the gravity pressure of the water directed against the buckets will not only impart torque to the rotor, but the water in moving away from the axis of the rotor in the buckets 18 will, by centrifugal action, assist in turning the rotor. The water discharges from the buckets 18 in the manner of a Barker's mill, and the reaction thus provided will further assist in the rotation of the rotor. The water is discharged from the buckets in a direction opposite to the direction of rotation and in striking the blades or spokes 21 will stop the whirling motion of the discharging stream of water. In this way, the gravity pressure of the water, centrifugal action thereof and reaction in discharging from the rotor will all combine for turning the rotor with maximum power. The rotor will also revolve with negligible if any vibration, and the turbine will operate efficiently and smoothly. The buckets or blades 18 of the rotor are inclined and so arranged and formed that they turn the rotor by the impinging of the water against the buckets by gravity pressure, by centrifugal action of the water in the buckets when moving outwardly in the buckets, and by the reaction of the water in discharging from the buckets. There are preferably more buckets 18 than there are guides 25 and spokes 21, although the numbers and sizes of the parts can vary under different conditions.

Having thus described the invention, what is claimed as new is:—

1. A water turbine comprising a casing having an upper inlet, a vertical shaft in the inlet, a rotor carried by the shaft in said casing, a sleeve valve slidable in the inlet for controlling the flow of water to the rotor, means for suspending said valve from the shaft, and a governor carried by the shaft cooperable with said means for controlling the valve.

2. A water turbine comprising a casing having an upper inlet, a rotor mounted for rotation in the casing below said inlet, and a sleeve valve slidable in said inlet into and out of the casing to control the flow of water from within the valve outwardly between the lower edge of said valve and the rotor, the rotor having buckets for the contact of the water after it passes under said lower edge of the valve.

3. A water turbine comprising a casing having an upper inlet, a shield in the casing under said inlet, a sleeve valve slidable in said inlet toward and away from said shield to control the flow of water from within the valve between the lower edge of the valve and shield, and a rotor mounted in the casing below said shield and having buckets beyond the edge of the shield.

4. A water turbine comprising a casing having a top provided with a water inlet, a shield under said inlet within the casing, a sleeve valve slidable in the inlet toward and away from the shield to control the flow of water from within the valve between the lower edge of the valve and shield, water guides connecting the shield and top of the casing around the lower edge of said valve, said shield having a bearing, a shaft journaled through said bearing, and a rotor carried by said shaft below said shield and having buckets beyond the edge of the shield adjacent to said water guides.

5. A water turbine comprising a vertical shaft, a rotor carried by said shaft, a vertically movable valve for controlling the flow of water to said rotor, means for suspending said valve including a sleeve slidable on said shaft, means carried by said shaft for yieldingly supporting said sleeve, and a governor carried by the shaft and operably connected with said sleeve for depressing the sleeve, to lower the valve, when the speed of rotation of the shaft is increased.

In testimony whereof I hereunto affix my signature.

MELVILLE R. COLE.